(12) United States Patent
Novak (10) Patent No.: US 7,408,838 B1
(45) Date of Patent: Aug. 5, 2008

(54) DIGITIZING PLANIMETER

(75) Inventor: Joel S. Novak, Sudbury, MA (US)

(73) Assignee: Scale Master Technologies, LLC, Carson City, NV (US)

( * ) Notice: Subject to any disclaimer, the term of this patent is extended or adjusted under 35 U.S.C. 154(b) by 0 days.

(21) Appl. No.: 11/625,623

(22) Filed: Jan. 22, 2007

(51) Int. Cl.
*G01B 5/26* (2006.01)

(52) U.S. Cl. .................. 367/99; 367/907; 702/156; 33/122

(58) Field of Classification Search .................. 367/99, 367/907; 33/122; 702/156; 178/19.02
See application file for complete search history.

(56) References Cited

U.S. PATENT DOCUMENTS

| | | | |
|---|---|---|---|
| 4,184,261 A | 1/1980 | Buerner | |
| 4,206,314 A | 6/1980 | Prugh et al. | |
| 4,500,977 A | 2/1985 | Gelhard | |
| 4,570,033 A | 2/1986 | Hulls | |
| 4,616,419 A | 10/1986 | Kubo | |
| 4,730,190 A | 3/1988 | Win et al. | |
| 4,794,208 A | 12/1988 | Watson | |
| 4,806,707 A | 2/1989 | Landmeier | |
| 4,827,086 A | 5/1989 | Rockwell | |
| 4,835,347 A | 5/1989 | Watson | |
| 4,853,497 A | 8/1989 | Landmeier | |
| 4,853,499 A | 8/1989 | Watson | |
| 4,859,813 A | 8/1989 | Rockwell | |
| 4,873,399 A | 10/1989 | Landmeier | |
| 4,878,553 A | 11/1989 | Yamanami et al. | |
| 4,939,318 A | 7/1990 | Watson et al. | |
| 4,956,526 A | 9/1990 | Murakami et al. | |
| 5,023,438 A | 6/1991 | Wakatsuki et al. | |
| 5,045,645 A | 9/1991 | Hoendervoogt et al. | |
| 5,095,180 A | 3/1992 | Yamamoto | |
| 5,107,079 A | 4/1992 | Hoendervoogt et al. | |

(Continued)

FOREIGN PATENT DOCUMENTS

GB 2220077 A * 12/1989

OTHER PUBLICATIONS

Ultra-Scale-Master-Pro; http://www.tigersupplies.com/Products/Ultra-Scale-Master-Pro-NEW-Area-Takeoff-Tool-and-Digitizer-System_6260.aspx; 5 pages; printed Feb. 19, 2008.*

(Continued)

*Primary Examiner*—Dan Pihulic
(74) *Attorney, Agent, or Firm*—Foley Hoag LLP (57) ABSTRACT

A planimeter includes a movable housing in which are mounted orthogonally aimed x- and y-position sensors. Each position sensor comprises a piezoelectric ultrasound transmitter and receiver for sending ultrasound to a reflector disposed on a drawing and sensing resultant echoes. Circuitry in the housing computes from the sensor outputs the housing's position for each of a sequence of locations on a drawing at which a user positions the housing, and from those it computes scaled distances between those positions as well as quantities that can be derived from those distances. The transmitter's and receiver's respective positions with respect to positioning crosshairs are such as to suppress the results of orientation errors. The planimeter's handle is angled at 45° to the directions in which the sensors are aimed so that it lends itself to both right- and left-handed operation.

21 Claims, 6 Drawing Sheets

U.S. PATENT DOCUMENTS

| | | |
|---|---|---|
| 5,124,509 A | 6/1992 | Hoendervoogt et al. |
| 5,130,500 A | 7/1992 | Murakami et al. |
| 5,134,253 A | 7/1992 | Doubrava |
| 5,160,813 A | 11/1992 | Watson |
| 5,164,585 A | 11/1992 | Lieu |
| 5,198,623 A | 3/1993 | Landmeier |
| 5,214,757 A | 5/1993 | Mauney et al. |
| 5,227,909 A | 7/1993 | Watson |
| 5,235,142 A | 8/1993 | Landmeier et al. |
| 5,247,138 A | 9/1993 | Landmeier |
| 5,270,692 A | 12/1993 | Rockwell |
| 5,287,105 A | 2/1994 | Schlotterbeck et al. |
| 5,325,398 A | 6/1994 | Murakami et al. |
| 5,326,940 A | 7/1994 | Doubrava et al. |
| 5,345,044 A | 9/1994 | Landmeier |
| 5,347,295 A | 9/1994 | Agulnick et al. |
| 5,357,061 A | 10/1994 | Crutchfield |
| 5,357,062 A | 10/1994 | Rockwell et al. |
| 5,373,118 A | 12/1994 | Watson |
| 5,381,160 A | 1/1995 | Landmeier |
| 5,384,688 A | 1/1995 | Rockwell |
| 5,408,055 A | 4/1995 | Harris et al. |
| 5,414,226 A | 5/1995 | Matsushima et al. |
| 5,436,598 A | 7/1995 | Harris |
| 5,525,981 A | 6/1996 | Abernethy |
| 5,544,255 A | 8/1996 | Smithies et al. |
| 5,554,827 A | 9/1996 | Oda et al. |
| 5,596,698 A | 1/1997 | Morgan |
| 5,627,348 A | 5/1997 | Berkson et al. |
| 5,630,168 A | 5/1997 | Rosebrugh et al. |
| 5,635,683 A | 6/1997 | McDermott et al. |
| 5,655,136 A | 8/1997 | Morgan |
| 5,670,754 A | 9/1997 | Matsushima et al. |
| 5,691,511 A | 11/1997 | Matsushima et al. |
| 5,693,914 A | 12/1997 | Ogawa et al. |
| 5,701,141 A | 12/1997 | Schmenk et al. |
| 5,714,720 A | 2/1998 | Landmeier |
| 5,727,329 A | 3/1998 | Kubo et al. |
| 5,736,686 A | 4/1998 | Perret, Jr. et al. |
| 5,737,740 A | 4/1998 | Henderson et al. |
| 5,760,347 A | 6/1998 | Notarianni et al. |
| 5,793,360 A | 8/1998 | Fleck et al. |
| 5,818,955 A | 10/1998 | Smithies et al. |
| 5,821,916 A | 10/1998 | Watson et al. |
| 5,875,556 A | 3/1999 | Kubo et al. |
| 6,118,118 A | 9/2000 | van der Lely et al. |
| 6,813,585 B2 | 11/2004 | Leutz et al. |
| 6,917,414 B2 | 7/2005 | Stierle et al. |
| 2005/0036662 A1 | 2/2005 | Brosnan |
| 2006/0201006 A1 | 9/2006 | Burlingham et al. |
| 2006/0259269 A1 | 11/2006 | Binder |

OTHER PUBLICATIONS

GP9™ Sonic Digitizer (GTCO/CalComp) www.gtco.com/gp9.htm (product was on sale prior to Jan. 22, 2006).

Planix 7 Roller Planimeter (Tamaya) www.engineersupply.com/Tamaya-Planix-7-Roller-Planimeter-3651-70.aspx (product was on sale prior to Jan. 22, 2006).

International Search Report for PCT/US07/88637.

Written Opinion of the International Searching Authority for PCT/US07/88637.

* cited by examiner

FIG. 7

DIGITIZING PLANIMETER

BACKGROUND OF THE INVENTION

1. Field of the Invention

The present invention concerns planimeters. It has particular, although not exclusive, application to planimeters based on transmission of ultrasound or other radiation.

2. Background Information

Many applications arise in which lengths, areas, and other quantities need to be inferred from scale-model drawings of buildings, plots of land, mechanical devices, etc. Even when the drawing features are single straight lines, determining the length of the real-world feature thereby represented takes time. So planimeters have been developed to make that task easier. Planimeters usually comprise some kind of wheel that gets rolled along the drawing feature to be measured and infers the feature's length from the number of rotations. Some additionally have provisions for entering the drawing scale, and the output produced by the planimeter is the result of multiplying the measured length by the scale.

Some planimeters have pairs of wheels that, due to differences in the wheels' rotations, enable them to infer not only one-dimensional length but also relative directions. Such planimeters often calculate and produce derived quantities such as areas. So planimeters contribute greatly to the ease of determining from drawings quantities such as how much carpet a room requires or how long a fence it would take to enclose a yard.

SUMMARY OF THE INVENTION

But I have recognized that planimeters for those and similar applications can be provided in a way that extends their usefulness and can be implemented without much expense. What I do is adapt to digitizing an approach that had previously been used only for what are sometimes known as "electronic tape measures." In accordance with this approach, an ultrasonic or other-radiation transmitter and receiver are positioned in a movable housing, and distances are inferred from the delays between the radiation's transmission and the reception of any resultant echo. This concept can be applied to planimeters by providing the device with the capacity to take such measurements of distances to two or more different reflector positions automatically from each of a sequence of a sequence of drawing positions over which the user positions the device, by storing the sequence of positions this inferred, and by calculating from such sequences quantities such as distances, areas, etc. Preferably such quantities are scaled, and the output is preferably provided in a human-readable form on the device itself.

DETAILED DESCRIPTION OF AN ILLUSTRATIVE EMBODIMENT

Figure 1:
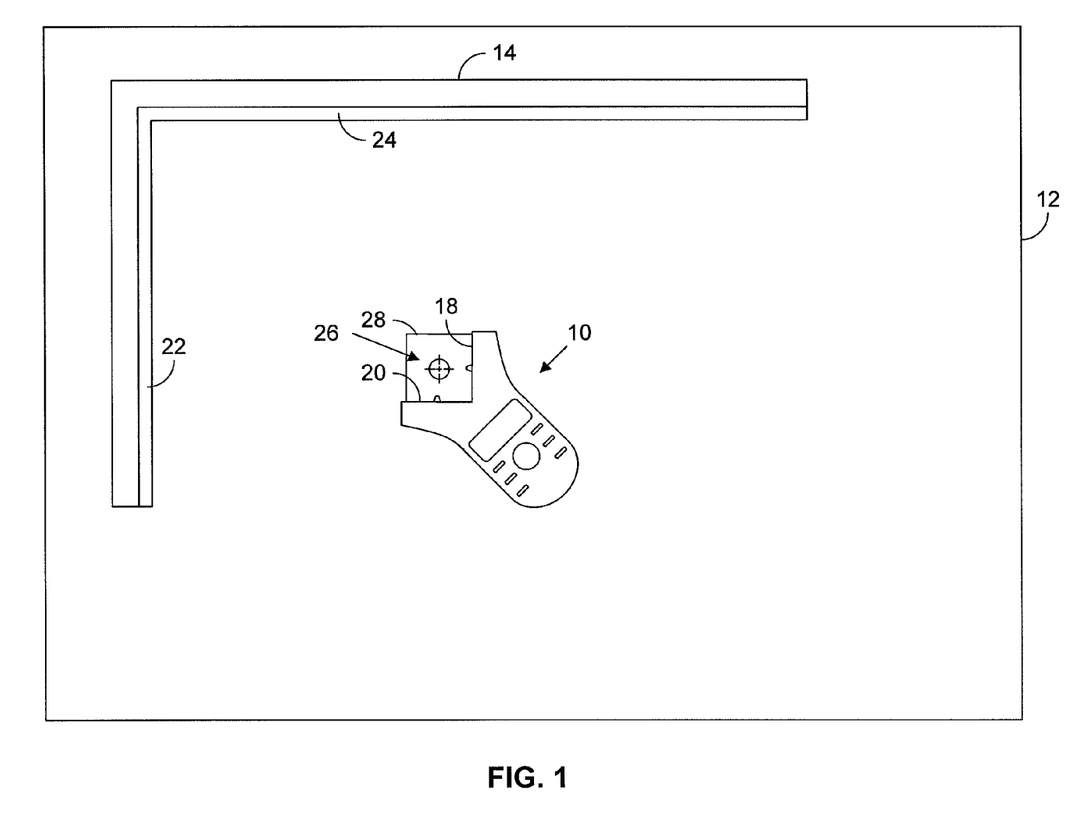
FIG. 1 is a plan view of one of the present invention's embodiments in use.

FIG. 1 depicts an embodiment of the present invention in the form of a movable "puck" 10 disposed on a drawing 12 from which quantities such as areas and peripheries are to be determined. The puck 10 works by measuring the delay between its emission of ultrasound pulses and its resultant reception of echoes reflected from a fiducial object such as a reflector assembly 14 placed by the user in a fixed position on the drawing 12.

Figure 2:
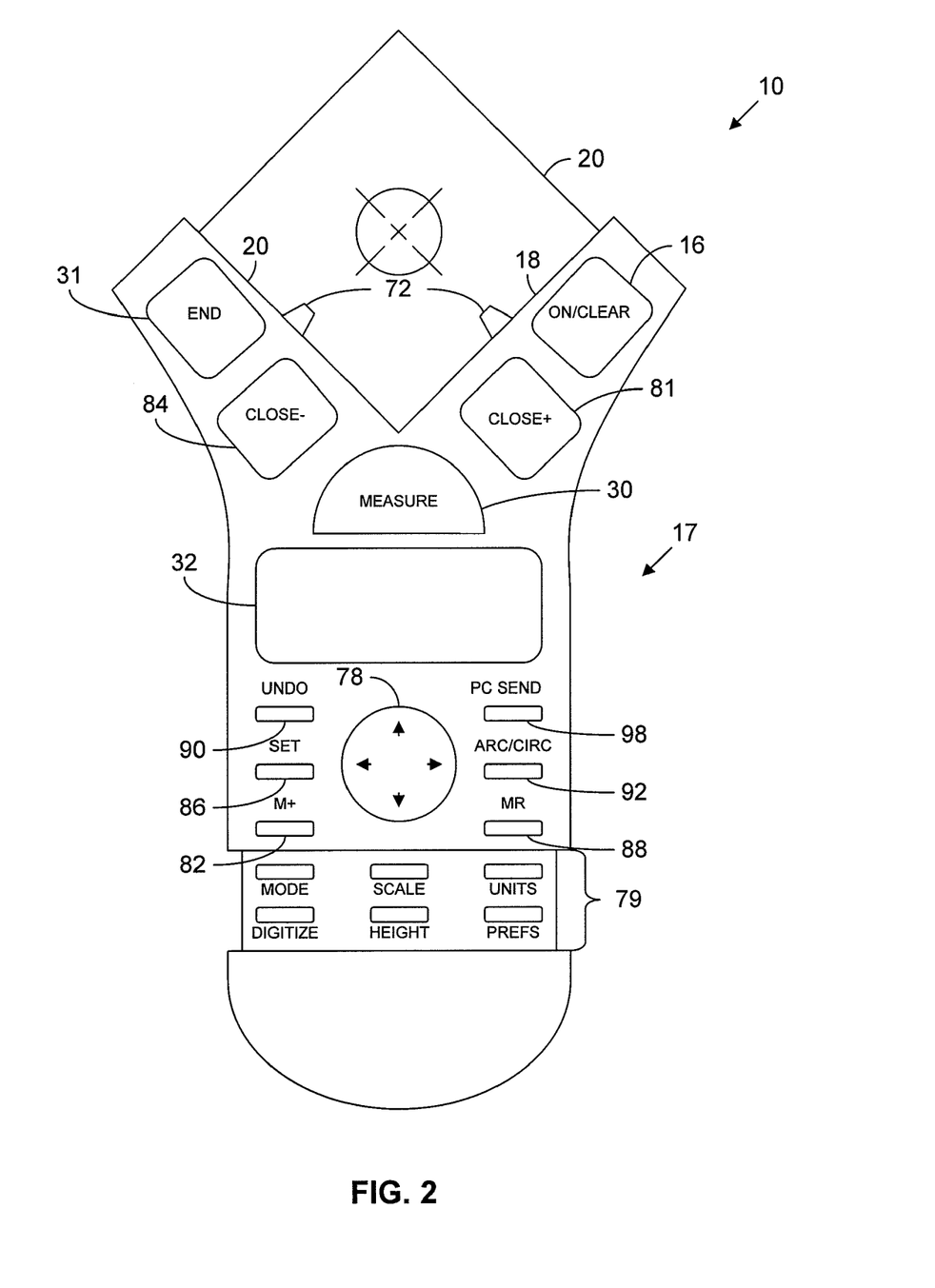
FIG. 2 is a more-detailed plan view of that embodiment.

To begin a new measurement, the user depresses the puck's ON/CLEAR key, which is identified in FIG. 2 by reference numeral 16. Grasping the puck's handle portion 17, the user then, as FIG. 1 shows, orients the puck's sensor-mounting faces 18 and 20 parallel to respective mutually orthogonal reflector faces 22 and 24. With the puck in that orientation, the user so locates the puck 10 that crosshairs 26 scribed in the puck's transparent or translucent window 28 are superimposed on a drawing point of interest. The point of interest typically lies on the outline of a drawing feature whose area, peripheral length, or other quantity is to be determined.

With the puck thus positioned, the user presses the puck's MEASURE button, identified in FIG. 2 by reference numeral 30. In a manner to be described in more detail below, the system responds by determining and storing the crosshair-indicated point's location with respect to the reflector faces 22 and 24. Typically, the user then moves the puck to a different drawing position and depresses the MEASURE button 30 again. What happens next depends on the feature to be measured and the type of measurement desired.

Suppose, for example, that the feature of interest is a property line to be fenced and that the measurement is being taken to determine the required fence length. If the property line is somewhat complex, the user may repeat the above point-locating operations several times, and the microprocessor 36 records in an internal data store the locations of the points thereby determined. Then, when the user has positioned the cross hairs on the end of the property-line portion to be fenced, the user depresses the END button 31. In response the system treats each pair of successive measured points as endpoints of a line segment belonging to the property line, it computes the resultant property-line length from those measurements and a scale factor that the user has previously entered, and it displays the result on the display 32.

Figure 3:
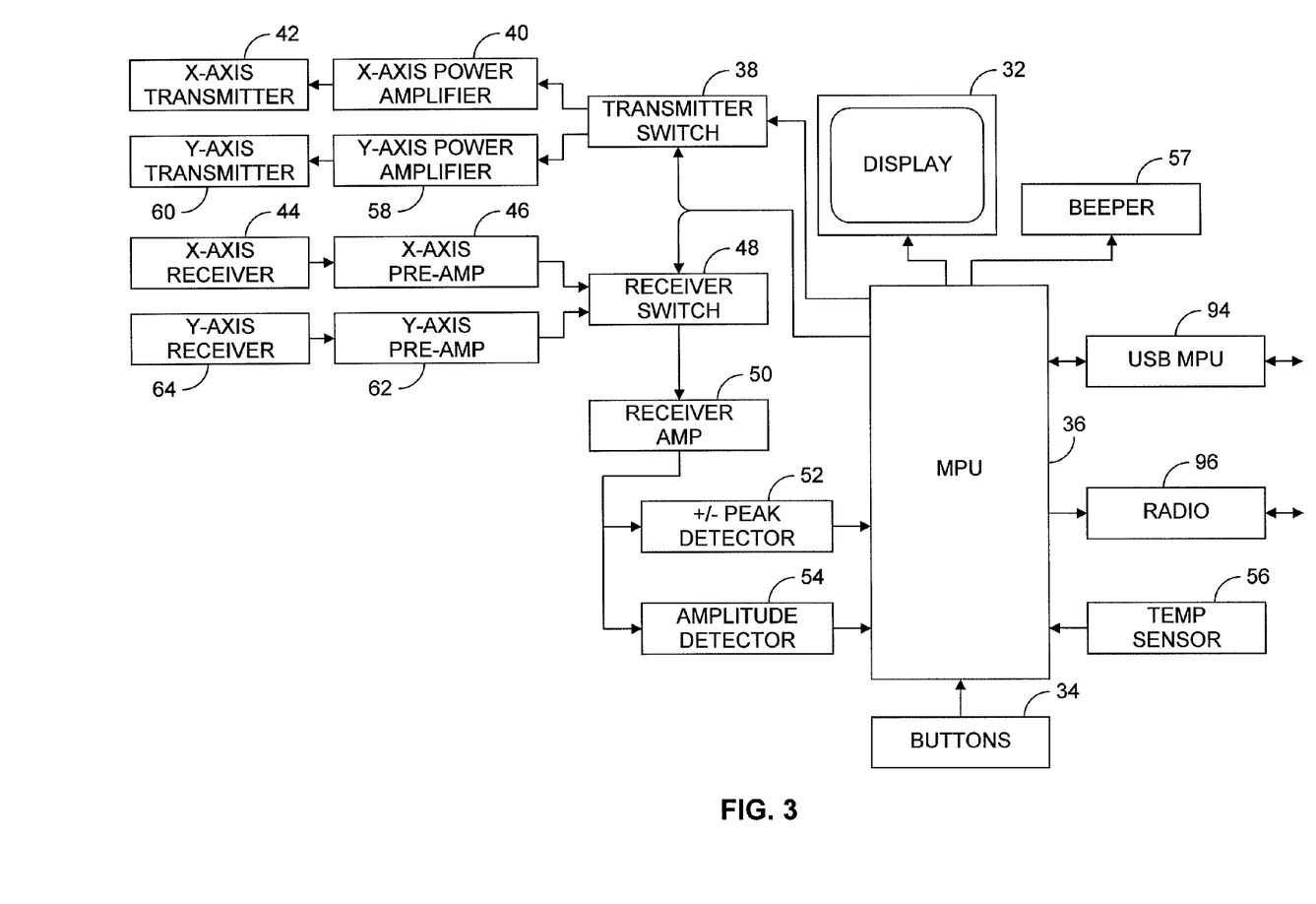
FIG. 3 is a block diagram of that embodiment.

The way in which the above-mentioned puck-position determination is made will now be described by reference to FIG. 3, which is a block diagram of the puck's circuitry. FIG. 3's block 34 represents the puck's buttons, including the above-mentioned MEASURE button. A processor 36 responds to depression of the MEASURE button by performing a sequence that starts with its sending a current-drive signal pulse through a transmitter switch 38 to an x-axis power transmitter 40. That transmitter may simply be, say, a transistor such as a MOSFET connected between a power rail and an x-axis transmitter 42, and that transmitter may be a high-Q piezoelectric transducer in parallel with an inductor coupled to the other power rail. During the current-drive pulse, the transistor allows current flow from the power source through the inductor, whose current rises to a level that is approximately proportional to the drive-signal pulse's duration. When the processor 36 ends that pulse, the transistor interrupts the current flow from the power source. The inductor's resultant back emf starts oscillation in the inductor-transducer combination at the transducer's natural frequency, which is about 50 kHz in the illustrated embodiment.

The piezoelectric transducer's resultant oscillation transmits an ultrasound pulse directed to one of the reflector assembly's surfaces, from which an echo propagates to the puck's x-axis receiver 44. A high-input-impedance pre-amplifier 46 buffers the resultant pulse-modulated sine-wave voltage, which, during a predetermined time window set by the microprocessor 36, a receiver switch 48 directs to a receiver amplifier 50. A peak detector 52 determines when the first peak occurs in amplifier 50's oscillatory output, independently of whether that peak is positive or negative, and an amplitude detector 54 determines the time of occurrence of the first peak within that window that thereafter exceeds a predetermined minimum.

If that minimum is not met, the microprocessor repeats the operation, this time with a longer current pulse so that the sonic-pulse amplitude is higher, and it continues repeating the operation until the echo's magnitude exceeds the minimum requirement. Also, the system determines what the delay is between the first peak and the one that exceeds the minimum; if the delay is too long—i.e., if the rise time is too great—then an obstruction such as a pencil or a user's finger may be in the way, and the system may attempt to avoid the resultant error by adjusting the window during which it "listens" for the first peak.

With the desired transmitter amplitude thereby determined, the processor repeatedly drives the transmitters with pulses of that amplitude. For each transmitted pulse, it measures the time that elapses before the resultant echo is received. It considers the echo received when the oscillatory receiver output's first cycle within the decided-upon time window first reaches a positive or negative maximum.

Because of noise and other factors, the elapsed time for a given puck position tends to vary from pulse to pulse, and various approaches can be taken to deal with that inconsistency. An approach that I have found to be relatively reliable begins by sending two pulses. If the two resultant elapsed-time measurements result in values that are equal (within the system's time-measurement resolution), the distance determination is based on that value. If they differ, then up to a maximum of three further measurements are made to find two readings in a row that are equal, and the distance determination is based on those two readings' value. If the number of readings reaches five without equality between two successive readings, then the lowest reading that does not differ excessively from the others is used. The distance determination is based on the speed of sound, of course, and the illustrated embodiment uses the output of a temperature sensor 56 to help arrive at an accurate value for that quantity. Some embodiments may additionally or instead use pressure and/or humidity sensors.

With the x measurement thus made, the system repeats the operation for the y direction. If both measurements were made successfully, the processor operates a beeper 57 once to indicate that the measurement was made successfully. Otherwise, it causes two beeps in quick succession to tell the user that the point should be re-measured.

Figure 4:
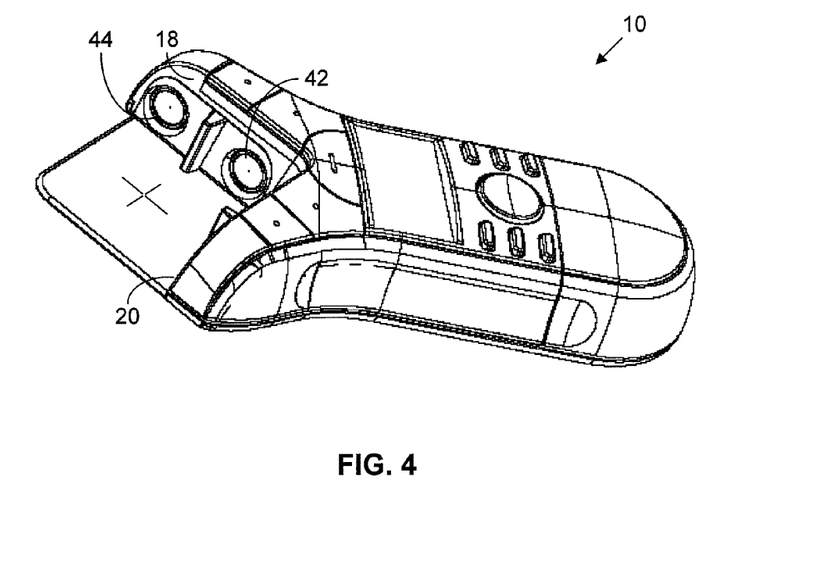
FIG. 4 is a perspective view of that embodiment.

As FIG. 4 shows, the x-axis transmitter 42 and receiver 44 are disposed on sensor surface 18. On the other sensor surface 20 is disposed another, y-axis transmitter, as is a y-axis receiver, and, after it has made the x-axis measurement, it similarly makes a y-axis measurement. As FIG. 3 shows, a power amplifier 58 like power amplifier 40 is provided for the y-axis receiver 60, and the processor 36 uses the transmitter switch 38 to control whether the current pulse goes to the x- or y-axis power transmitter. Similarly, it uses the receiver switch 48 to control whether the input to the receiver amplifier 50 comes from the x-axis preamplifier 46 or from a similar preamplifier 62, which buffers the y-axis receiver's output.

We digress here to note that the measurement depends on the user's orienting the puck as described above, i.e., with the puck's sensor-bearing surfaces parallel to the reflector faces from which they are to receive echoes. However, the system permits a significant departure from exact parallelism, as can be appreciated by reference to FIG. 5, which is an idealized far-field sensor-pattern diagram for transmitter 42 and receiver 60. In that diagram, in which the angles are shown as measured from the normal to sensor face 18, trace 66 represents the relative magnitude of transmitter 42's ultrasound-pressure level as a function of transmission angle, while trace 68 represents the receiver's sensitivity as a function of reception angle, and their (normalized) product, trace 70, is the transmitter-receiver pair's combined pattern. The plots are intended only to be suggestive rather than accurate; typical actual 6 db beam widths may be on the order of 50° to 60°, although those values are not critical, and beam shapes outside that range can also be used.

Figure 5:
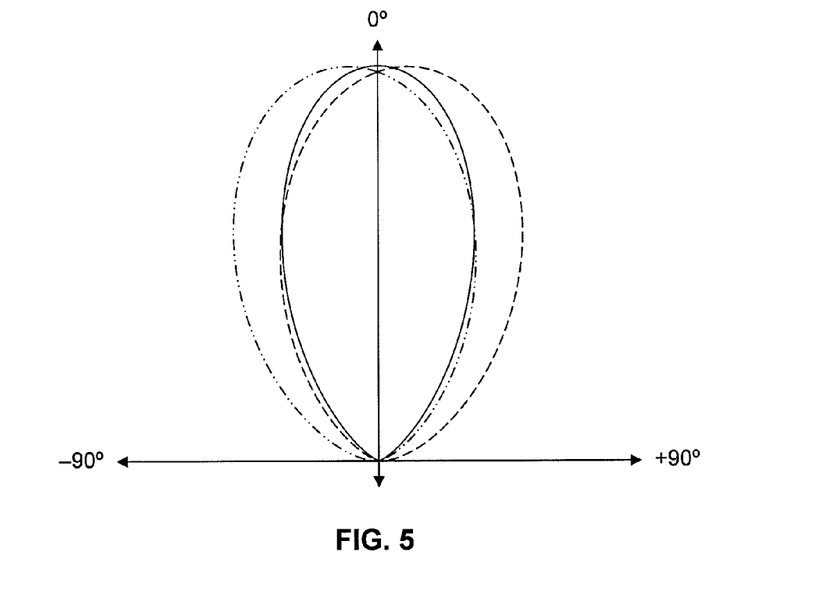
FIG. 5 is a sensor-pattern diagram containing plots of that embodiment's sensor patterns.

As trace 70 shows, the transmitter-receiver combination remains sensitive through a significant range about the normal. As a consequence of that fact and the fact that ultrasound power decays exponentially with distance, the first receiver-cycle maximum will typically result from a path representing the shortest distance to the reflector surface—and therefore a path perpendicular to it—even if the puck's sensor-bearing faces are not oriented exactly parallel to the reflector faces.

Now, that perpendicular distance from one of the transducers to the reflector will itself be affected by departures from perpendicularity. As can be seen in FIG. 4, though, the transmitter and receiver transducers are so spaced from the crosshair intersection point that pivoting about that intersection point through small angles makes the distance to the reflector assembly decrease for one of those transducers if it increases for the other. Ideally the spacing is symmetrical so that the increase in the one distance equals the decrease in the other. Although assembly and other tolerances will typically prevent strict equality, the transducers can almost always be so placed that most of the one distance's variation will canceled out by the other's.

Additionally, of course, the patterns in FIG. 5 are themselves idealized, and the overall pattern would not in most embodiments be quite as symmetrical as trace 70 suggests. Nor would the maximum necessarily occur precisely on the normal to the sensor-bearing surface. Features such as the sensor-bearing surfaces 18 and 20 themselves and the crosstalk barriers identified in FIG. 2 by reference numeral 72 will tend to skew the pattern to some extent. In the illustrated embodiment, moreover, the transmitter and receivers are intentionally mounted with a little tilt toward the cross hairs. The reason for this is to increase sensitivity in the very-near field. Although in the far field each receiver-transmitter pair's individual patterns largely overlap, the spacing between the receiver and transmitter tends to cause the overlap, and thus the transducer pair's sensitivity, to be reduced. Tilting the transducers in such a manner that their patterns are inclined toward each other, as FIG. 5's plots 66 and 68 suggest in an exaggerated fashion, tends to mitigate this effect.

In the illustrated embodiment, the two sensors are aimed at right angles to each other. That is, FIG. 6's angle α between dashed line 74, which divides one transmitter-receiver pair's pattern into equal-power portions, and dashed line 76, which similarly divides the other transmitter-receiver pair's pattern, is 90°. But strict orthogonality is not necessary; indeed, any non-zero angle can theoretically be used to obtain the required two-dimensional information. Still, angles α that differ from 90° by more than 20° will find little if any practical use, and that angle preferably differs from the ideal by less than 10°.

Figure 6:
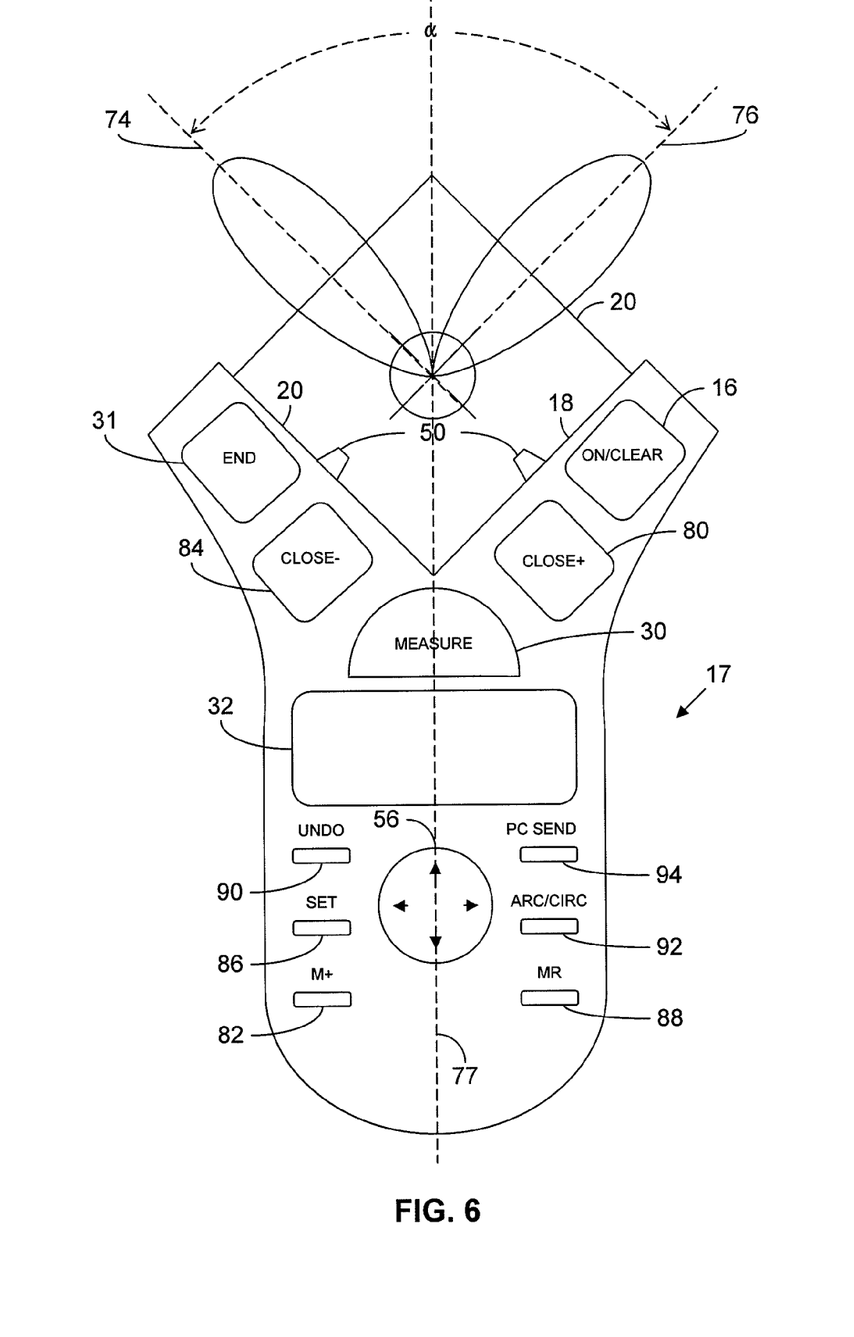
FIG. 6 is a plan view similar to FIG. 2 but with lines depicting geometrical relationships between the handle and sensor angles.

FIG. 6 illustrates another of the illustrated embodiment's advantageous features, namely, that the handle portion 15 is oriented at an angle to the sensor directions. That is, dashed line 77, which is the axis about which the handle portion's second moment of area is lowest, is not parallel to either of the directions in which the transmitter-receiver pairs are aimed. It turns out that such an arrangement makes the puck more natural to hold when the puck is in the proper orientation. Although the handle's angle does not have to form the illustrated, 45° angle to provide this benefit to some extent, something near to that angle is desirable both for comfort and for an additional reason, which FIG. 7 illustrates.

Figure 7:
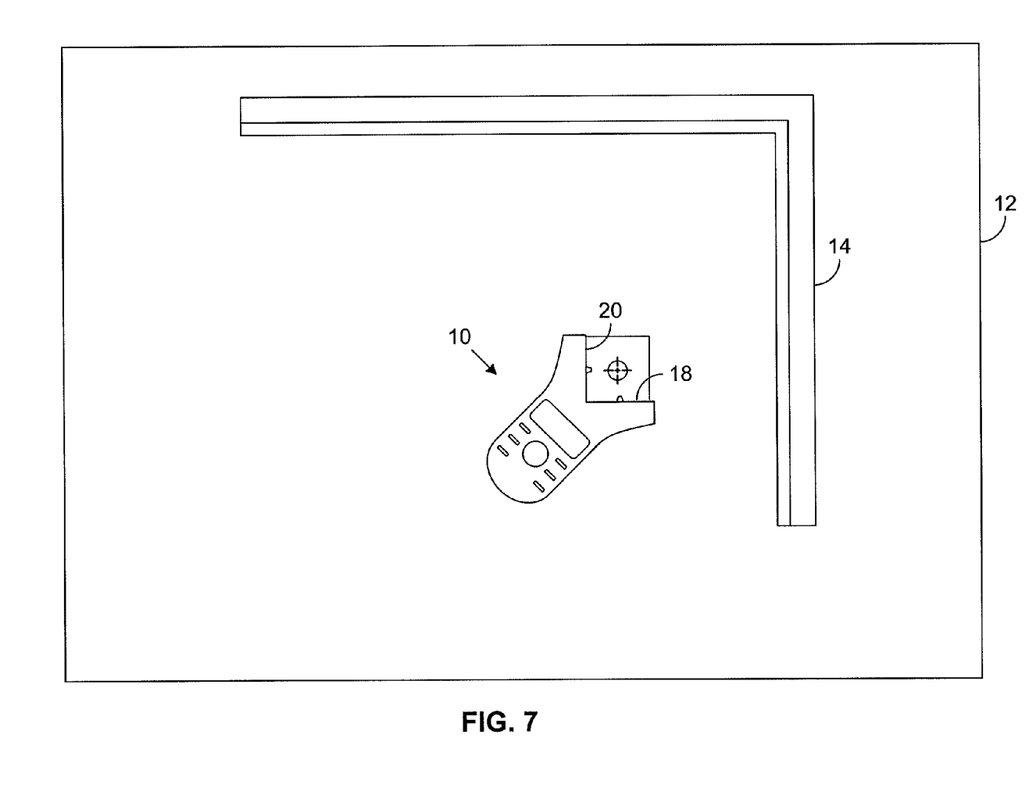
FIG. 7 is a plan view similar to FIG. 1 but showing the embodiment oriented for left-handed use.

FIG. 7 is similar to FIG. 1, except that FIG. 7 shows the puck orientation that a left-handed person would use, whereas FIG. 1's is the one that a right-handed person would use. As that drawing shows, the reflector 14 would be located to the right of the puck 10 rather than to the left, and the receiver-transmitter pair used to determine the x component of the puck's two-dimensional position is the one positioned on face 20 rather than those on face 18; user set-up operations would inform the system of whether the user is employing the puck in the right- or left-handed mode, and its calculations would be accordingly adjusted; for one of the sensors, the inferred coordinate would increase with measured distance in the left-handed mode and decrease with it in the right-handed mode. So orienting the puck's handle portion at an angle makes the puck ambidextrous. Of course, an exact 45° angle is not necessary to achieve this result, but the angle of the handle's axis 77 should be closer to the bisector of the angle between the sensor directions 74 and 76 than to either of those directions themselves.

As was explained above, the system can be used to measure a feature's total length, and some embodiments enable the user to enter a height value to be multiplied by that length. When the display 32 displays the length of a wall in response to the user's depressing the END key 31, for example, the user can press center pad 78's down-indicating edge to display the wall area arrived at by assuming a previously entered wall height. (In the illustrated embodiment, settings such as wall height, drawing scale, etc. are entered through keys in a normally concealed supplemental key region 79 that opening a slidable bottom sleeve 80 reveals.) Depressing that edge again may result in the assumed height's being displayed, and depressing the up- and down-indicating edges may cause the display to scroll back and forth through those values.

If instead of depressing the END key 31 after the last position entry the user depresses the CLOSE+ key 81, the system not only treats each entered point as defining a line segment with the one before it but also treats the first and last entered points as doing so, too: depressing that key creates a closed figure, which itself have an area that manipulating the center pad 78 enables the user to display in addition to the length of the figure's periphery. The closed figure may represent a room whose wall height has been previously entered, in which case that pad also enables the user to cause the room's wall area and volume to be displayed.

It sometimes happens that the area is desired of a closed figure from which some interior space has been removed. In that case, the user can depress the M+button 82 and then start a new closed figure, this figure being the interior portion to be excluded. The interior figure is measured as described above except that, instead of ending the measurement with CLOSE+, the user depresses the CLOSE– button 84 to indicate that the area has a negative value, and, when that area appears on the display, depresses the SET button 86 and then the M+ button to indicate that the memory contents should be updated by adding the (negative) displayed value to the previously stored results. Depressing the MR button 88 causes that updated value to be displayed.

When the user recognizes that an error has been made in entering a location, he can depress the UNDO button 90 to remove that location from the sequence being entered. But errors can go unnoticed, and this is particularly true when a great many points are being entered for a curve. Additionally, measurement errors arising simply from unavoidable inexactitude in locating points can tend to accumulate. This effect can be reduced in cases in which the user recognizes all or part of the curve as an arc or complete circle.

If the user recognized a shape as an arc, he starts the measurement as before by pressing the ON/CLEAR key 16 twice. Before he uses the MEASURE key 30 to enter the first, though, the user depresses the ARC/CIRC key 92 to indicate that the points about to be entered are not line-segment endpoints but rather an arc's first end point, an intermediate point on the arc, and the arc's other end point. Consequently, entry of the third point results automatically in the system's determining the arc's length, the area defined by the arc and its cord, and, if height has been entered previously, the wall area and "room" volume.

The procedure starts in the same manner if the user recognizes the shape as a complete circle, with the exception that the user presses the ARC/CIRC key 92 twice instead of once. The third point's entry results in the system's determining the circumference and area of the circle that that three entered points define. If the first two points are the ends of the circle's diameter, the user can press the CLOSE+ key to signify that fact, and the system will compute the length, area, volume, etc. accordingly.

Of course, the system identifies individual points in two-dimensional space in the course of tracing drawing features. Some embodiments may display these raw data. Or the system may be used as a digitizer input to provide those data, as well as derived data such as those described above, to, say, some personal-computer application. Standard interfaces have been provided for such input, and, as FIG. 3's blocks 94 and 96 indicate, the data can be supplied over a wired or wireless connection to an application running on a personal computer. For example, the user may depress the PC SEND key identified in FIG. 2 by reference numeral 98 to cause the value displayed on the puck's display 32 to populate a selected cell in a spreadsheet program running on a PC coupled to the system.

It is apparent from the foregoing description using the present invention's teachings makes possible a flexible yet potentially inexpensive planimeter. The invention thus constitutes a significant advance in the art.

What is claimed is:

1. A planimeter comprising:
   A) a housing;
   B) a pair of distance sensors secured to the housing, each of which is associated with a different sensor region and includes:
      i) a radiation transmitter operable to send radiation into the sensor region associated with the distance sensor that includes that distance sensor; and
      ii) a radiation receiver that is disposed in the housing and generates in response to echo radiation reflected from the sensor region associated with that distance sensor a sensor output dependent on that echo radiation; and C) computation circuitry contained in the housing and so arranged as to:
  i) determine a respective two-dimensional position of the housing, for each of a sequence of locations of the housing, from the difference between times of radiation transmission and reception that occur while the housing is disposed at that location;
  ii) store the sequence of two-dimensional positions thereby determined;
  iii) compute at least one length from the difference between a pair of such two-dimensional positions in that sequence; and
  iv) generate an output representative of a quantity that depends on at least one such length.

2. A planimeter as defined in claim 1 further including a display, disposed on the housing, that provides a human-readable representation of the quantity that the output represents.

3. A planimeter as defined in claim 1 wherein the circuitry accepts a scale input in accordance with which it scales outputs that it generates.

4. A planimeter as defined in claim 1 wherein:
A) the planimeter includes a positioning indicium adapted for alignment with a drawing feature; and
B) the determined two-dimensional positions are those of the positioning indicium.

5. A planimeter as defined in claim 4 further including a transparent or translucent window in which the positioning indicium is provided.

6. A planimeter as defined in claim 4 wherein each radiation sensor's radiation transmitter and receiver are so spaced from the positioning indicium that pivoting of the housing through small angles about the pivoting indicium from an orientation in which the sensor is aimed perpendicularly at an elongated reflector:
A) results in an increase in the distance from the reflector to that radiation sensor's radiation transmitter if a decrease in the distance from the reflector to the radiation sensor's radiation receiver results from that pivoting; and
B) results in a decrease in the distance from the reflector to that radiation sensor's radiation transmitter if an increase in the distance from the reflector to the radiation sensor's radiation receiver results from that pivoting.

7. A planimeter as defined in claim 6 wherein:
A) each radiation sensor's radiation transmitter and receiver are so spaced from the positioning indicium that pivoting the housing through small angles about the positioning indicium from an orientation in which that sensor is aimed perpendicularly at an elongated reflector causes variations in the distances from that radiation sensor's radiation transmitter and receiver to the reflector; and
B) at least most of the resultant variation in the distance from the reflector to one of that radiation sensor's radiation transmitter and receiver is canceled by the resultant variation in the distance from the reflector to the other of that radiation sensor's radiation transmitter and receiver.

8. A planimeter as defined in claim 1 wherein the radiation that the radiation transmitter sends and to which the radiation receiver responds is ultrasound.

9. A planimeter as defined in claim 1 wherein the relative positions of the sensor regions with respect to the housing are fixed.

10. A planimeter as defined in claim 1 wherein the angle between the directions in which the sensors are aimed differ by between 70° and 110°.

11. A planimeter as defined in claim 10 wherein the angle between the directions in which the sensors are aimed differ by between 80° and 100°.

12. A planimeter as defined in claim 1 wherein:
A) the housing forms a handle portion; and
B) the direction of an axis of the handle portion is closer to that of the bisector of the angle between the sensor directions than it is to either of those directions themselves.

13. A planimeter as defined in claim 12 wherein:
A) the circuitry accepts a mode input that indicates whether the planimeter is to operate in a right-handed or left-handed mode; and
B) the two-dimensional position's determination depends on the mode thereby indicated.

14. A planimeter as defined in claim 1 wherein:
A) the planimeter further includes a display, disposed on the housing, that provides a human-readable representation of the quantity that the output represents;
B) the radiation that the radiation transmitter sends and to which the radiation receiver responds is ultrasound; and
C) the planimeter further includes user-operable keys, mounted on the housing, to which the circuitry responds.

15. A planimeter as defined in claim 14 wherein:
A) at least one said key is operable by a user to indicate that the housing is currently in one of the sequence of housing locations at which a respective two-dimensional position is to be determined; and
B) the planimeter generates a user-perceptible alert if its attempt to make the position determination was not successful.

16. A planimeter comprising:
A) a housing that forms a handle portion;
B) a pair of distance sensors secured to the housing and so aimed that the direction of the handle portion's axis is farther from both of the directions in which the distance sensors are aimed than from the direction of the bisector of the angle between them, each of the distance sensors being associated with a different sensor region and including:
  i) a radiation transmitter operable to send radiation into the sensor region associated with the distance sensor that includes that distance sensor; and
  ii) a radiation receiver that is disposed in the housing and generates in response to echo radiation reflected from the sensor region associated with that distance sensor a sensor output dependent on that echo radiation; and
C) computation circuitry so arranged as to:
  i) determine the housing's two-dimensional positions from the differences between times of radiation transmission and reception;
  ii) compute a quantity from the positions thus determined; and
  iii) generate an output representative of that quantity.

17. A planimeter as defined in claim 16 wherein:
A) the circuitry accepts a mode input that indicates whether the planimeter is to operate in a right-handed or left-handed mode; and
B) the two-dimensional position's determination depends on the mode thereby indicated.

18. A planimeter comprising:
A) a housing that forms a positioning indicium adapted for alignment with a drawing feature;
B) a pair of distance sensors secured to the housing and so arranged that
  i) each of the distance sensors is associated with a different sensor region;

ii) each distance sensor includes:
  a) a radiation transmitter operable to send radiation into the sensor region associated with the distance sensor that includes that distance sensor; and
  b) a radiation receiver that is disposed in the housing and generates in response to echo radiation reflected from the sensor region associated with that distance sensor a sensor output dependent on that echo radiation; and
iii) each radiation sensor's radiation transmitter and receiver are so spaced from the positioning indicium that pivoting of the housing through small angles about the pivoting indicium from an orientation in which the sensor is aimed perpendicularly at an elongated reflector:
  a) results in an increase in the distance from the reflector to that radiation sensor's radiation transmitter if a decrease in the distance from the reflector to the radiation sensor's radiation receiver results from that pivoting; and
  b) results in a decrease in the distance from the reflector to that radiation sensor's radiation transmitter if an increase in the distance from the reflector to the radiation sensor's radiation receiver results from that pivoting; and C) computation circuitry so arranged as to:
  i) determine the positioning indicium's two-dimensional positions from the differences between times of radiation transmission and reception;
  ii) compute a quantity from the positions thus determined; and
  iii) generate an output representative of that quantity.

19. A planimeter as defined in claim 18 wherein:
A) each radiation sensor's radiation transmitter and receiver are so spaced from the positioning indicium that pivoting the housing through small angles about the positioning indicium from an orientation in which that sensor is aimed perpendicularly at an elongated reflector causes variations in the distances from that radiation sensor's radiation transmitter and receiver to the reflector; and
B) at least most of the resultant variation in the distance from the reflector to one of that radiation sensor's radiation transmitter and receiver is canceled by the resultant variation in the distance from the reflector to the other of that radiation sensor's radiation transmitter and receiver.

20. A planimeter as defined in claim 18 further including a transparent or translucent window in which the positioning indicium is provided.

21. A planimeter as defined in claim 18 wherein both of the position sensors are aimed toward the positioning indicium.

* * * * *